(12) United States Patent
Nien et al.

(10) Patent No.: US 8,314,771 B2
(45) Date of Patent: Nov. 20, 2012

(54) OPERATION CONTROL DEVICE

(75) Inventors: Hsiu-Yuan Nien, New Taipei (TW); Yu-Chih Cheng, New Taipei (TW)

(73) Assignee: Liang Hsu, New Taipei (TW)

( * ) Notice: Subject to any disclaimer, the term of this patent is extended or adjusted under 35 U.S.C. 154(b) by 78 days.

(21) Appl. No.: 13/064,828

(22) Filed: Apr. 20, 2011

(65) Prior Publication Data

US 2012/0169595 A1    Jul. 5, 2012

(30) Foreign Application Priority Data

Dec. 29, 2010    (TW) .............................. 99225383 U

(51) Int. Cl.
*G06F 3/033*    (2006.01)
*G09G 5/08*    (2006.01)

(52) U.S. Cl. ........ 345/158; 345/156; 345/157; 248/917; 368/88

(58) Field of Classification Search .......... 345/156–158, 345/169, 173; 248/917, 918; 368/88, 276
See application file for complete search history.

(56) References Cited

U.S. PATENT DOCUMENTS

| | | | | |
|---|---|---|---|---|
| 6,034,670 | A * | 3/2000 | Chen | 345/163 |
| 6,211,860 | B1 * | 4/2001 | Bunsen | 345/157 |
| 6,809,724 | B1 * | 10/2004 | Shiraishi et al. | 345/169 |
| 7,884,802 | B2 * | 2/2011 | Yoshioka | 345/169 |
| 7,903,087 | B2 * | 3/2011 | Mak-Fan et al. | 345/167 |
| 2007/0209024 | A1 * | 9/2007 | Lee et al. | 715/856 |
| 2009/0023478 | A1 * | 1/2009 | Lowles et al. | 455/566 |
| 2010/0225583 | A1 * | 9/2010 | Ohta | 345/158 |
| 2011/0163950 | A1 * | 7/2011 | Ye et al. | 345/157 |

* cited by examiner

*Primary Examiner* — Kimnhung Nguyen
(74) *Attorney, Agent, or Firm* — Kirton McConkie; Evan R. Witt

(57) ABSTRACT

An operation control device includes a housing, a control module having a movable operating device carried on a carrier frame in the housing and partially exposed to the outside and rotatable and axially slidable by the user, a circuit module, which includes a rotation sensor module for sensing the direction and amount of rotation of the movable operating device and producing a respective control signal and magnetic sensors for sensing the direction and amount of axial displacement of the movable operating device in a non-contact manner. The human-friendly design of the operation control device facilitates cursor control, assuring high operation stability and comfort.

13 Claims, 8 Drawing Sheets

OPERATION CONTROL DEVICE

This application claims the priority benefit of Taiwan patent application number 099225383, filed on Dec. 29, 2010.

BACKGROUND OF THE INVENTION

1. Field of the Invention

The present invention relates to cursor control technology and more particularly, to an operation control device, which is a human-friendly design that allows the user to keep in one same posture during operation, enhancing operation stability and comfort.

2. Description of the Related Art

Following fast development of the modern technology and electronic industry, many different kinds of consumer electronics, such as computer, mobile telephone, digital camera, personal digital assistant, multimedia player and etc., have entered into our daily life. Nowadays, computer has become an important tool and is intensively used by people daily. Further, following the development and popularization of home and office networks, people can use the internet to search information, listen to music, watch movies and TV news, play on-line games, send and receive e-mails, make on-line shopping, on-line subscription and on-line payment.

Further, a computer has multiple functions, bringing convenience to the user. Further, a computer may be equipped with a keyboard and/or mouse for controlling a cursor on a display screen for menu item selection, cursor dragging or other operations. When operating a computer mouse, a user may rest the wrist of the hand on the desk or a mouse pad and then move the computer mouse or click the button of the computer mouse with the fingers. However, when going to move the computer mouse over a big area, the user must lift the wrist from the desk or mouse pad. Excessive or improper use of a computer may cause pain in the wrist (the so-called carpal tunnel syndrome). In order to eliminate this problem, wrist rests are created. A wrist rest is a device used to support the wrist while typing or when using a computer mouse. However, leaning the wrists on a wrist rest for long periods can put a lot of pressure on the undersides of the wrists. This may cause carpal tunnel syndrome to develop. Actually, a wrist rest does help align the user's hands and wrists while mousing. Further, an improperly used wrist rest may actually cause more repetitive stress injuries for those who mouse for extended periods of time. To avoid wrist injury, a wrist pad may be used. However, when operating a mouse, the user may lift the hand from the wrist pad to move the mouse, lowering the practicability of the wrist pad. Therefore, computer manufacturers are trying hard to create orthopedically engineered computers and computer peripheral devices.

SUMMARY OF THE INVENTION

The present invention has been accomplished under the circumstances in view. It is one object of the present invention to provide an operation control device, which is a human-friendly design, enhancing operation stability and comfort.

To achieve this and other objects of the present invention, an operation control device comprises a housing, a control module and a circuit module. The control module and the circuit module are accommodated in the housing. The housing has an elongated slot located on the top side thereof. The control module comprises a carrier frame mounted in the housing, and a movable operating device supported on the carrier frame and suspending in the elongated slot and peripherally partially protruding over the top side of the housing for operation by the user. The circuit module comprises a circuit board carrying a microprocessor, a rotation sensor module electrically connected to the microprocessor and adapted for sensing the direction and amount of rotation of the movable operating device, and two magnetic sensors respectively electrically connected to the microprocessor and adapted for sensing the direction and amount of axial displacement of the movable operating device. Thus, the user can rest the wrists of the hand on a wrist pad at the front side of the housing, and then rotate or slide the movable operating device to control the functioning of a cursor on a display screen of an electronic apparatus with which the operation control device is used. This human-friendly design does not cause the user's fingers to ache after a long operation, assuring operating stability and comfort.

Further, the movable operating device of the control module comprises an elongated base member, and a sleeve sleeved onto the elongated base member and rotatable and axially slidable by the user relative to the elongated base member. Further, the rotation sensor module is mounted in the elongated base member and surrounded by the sleeve. Therefore, the sleeve protects the rotation sensor module against outside dust and micro particles and keeps the rotation sensor module from sight, assuring sensing accuracy of the rotation sensor module and saving the surface space of the circuit board of the circuit module. Thus, the invention has small-sized and nice-looking characteristics.

Further, each magnetic sensor consists of a lever pivotally mounted in the housing and biasable by the movable operating device, a magnet located on one end of the lever, and, a magnetic sensing element adapted for sensing the strength of the magnetic field induced by the magnet that is indicative of the direction and amount of axial displacement of the movable operating device. Subject to the non-contact sensing operation of the magnetic sensors, the invention effectively and accurately senses the amount and direction of the displacement of the movable operating device and eliminates the drawbacks of mechanical fatigue and contact error of conventional contact switch designs.

DETAILED DESCRIPTION OF THE PREFERRED EMBODIMENT

Figure 1:
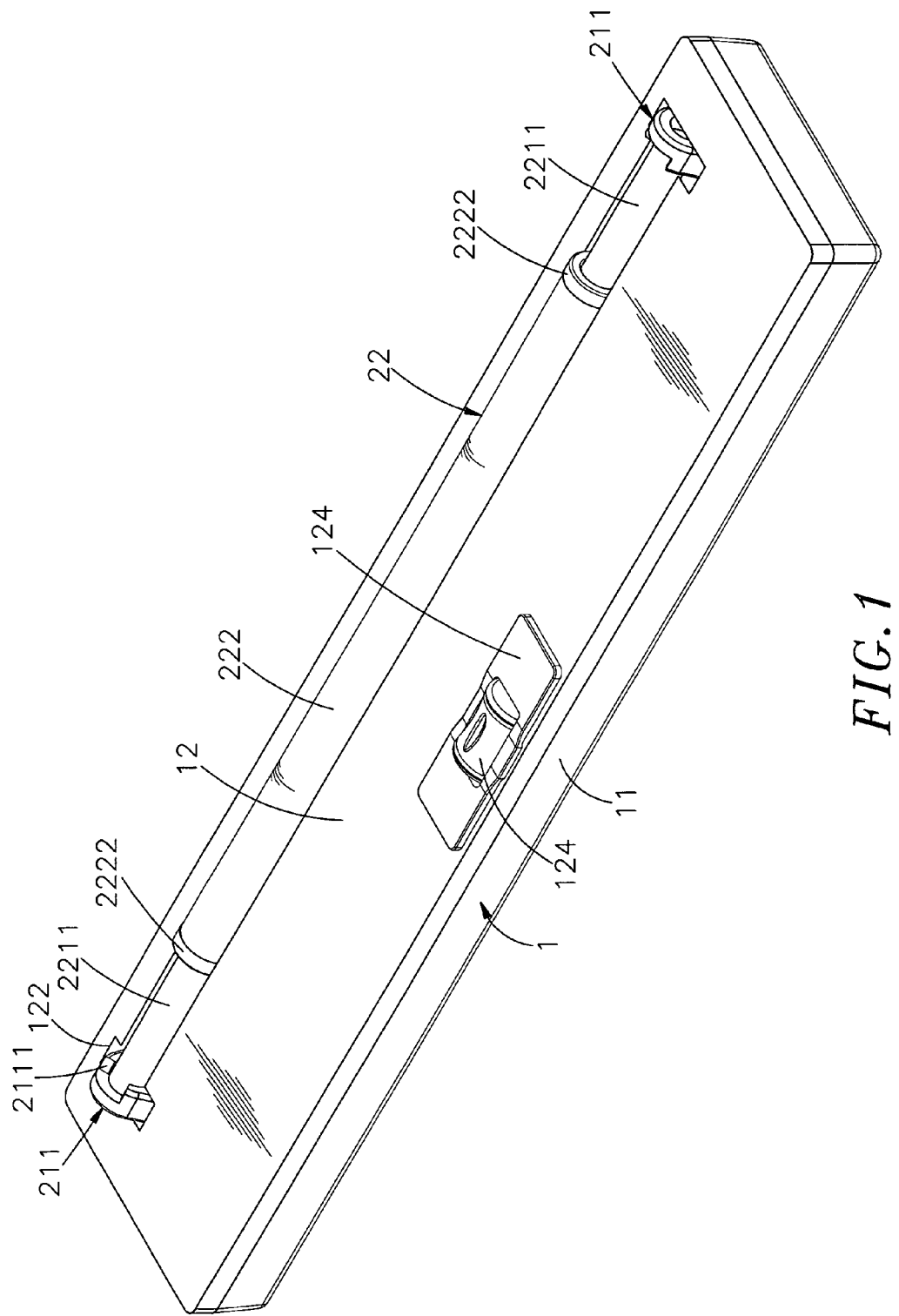
FIG. 1 is an elevational view of an operation control device in accordance with the present invention.
Figure 2:
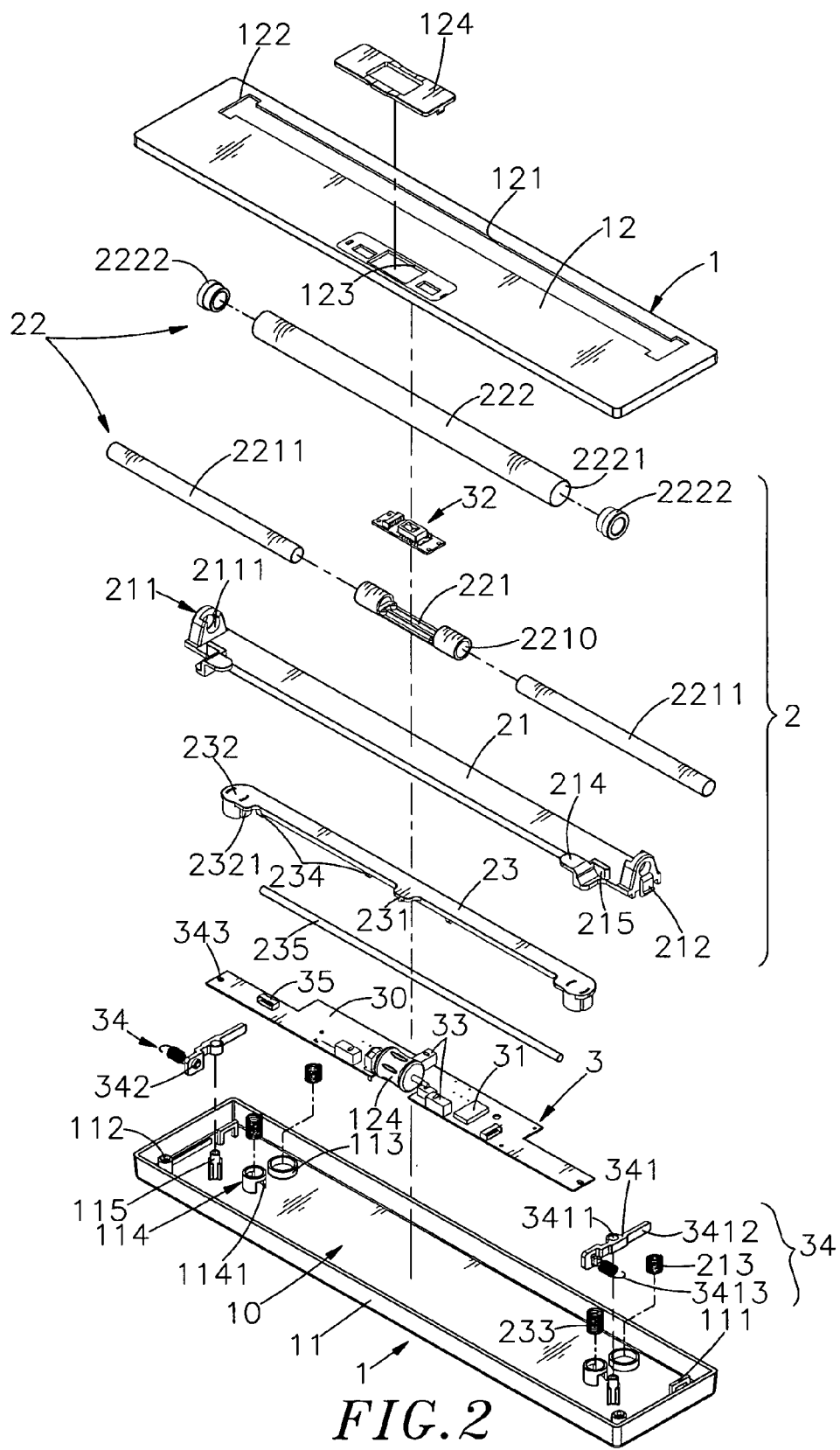
FIG. 2 is an exploded view of the operation control device in accordance with the present invention.
Figure 3:
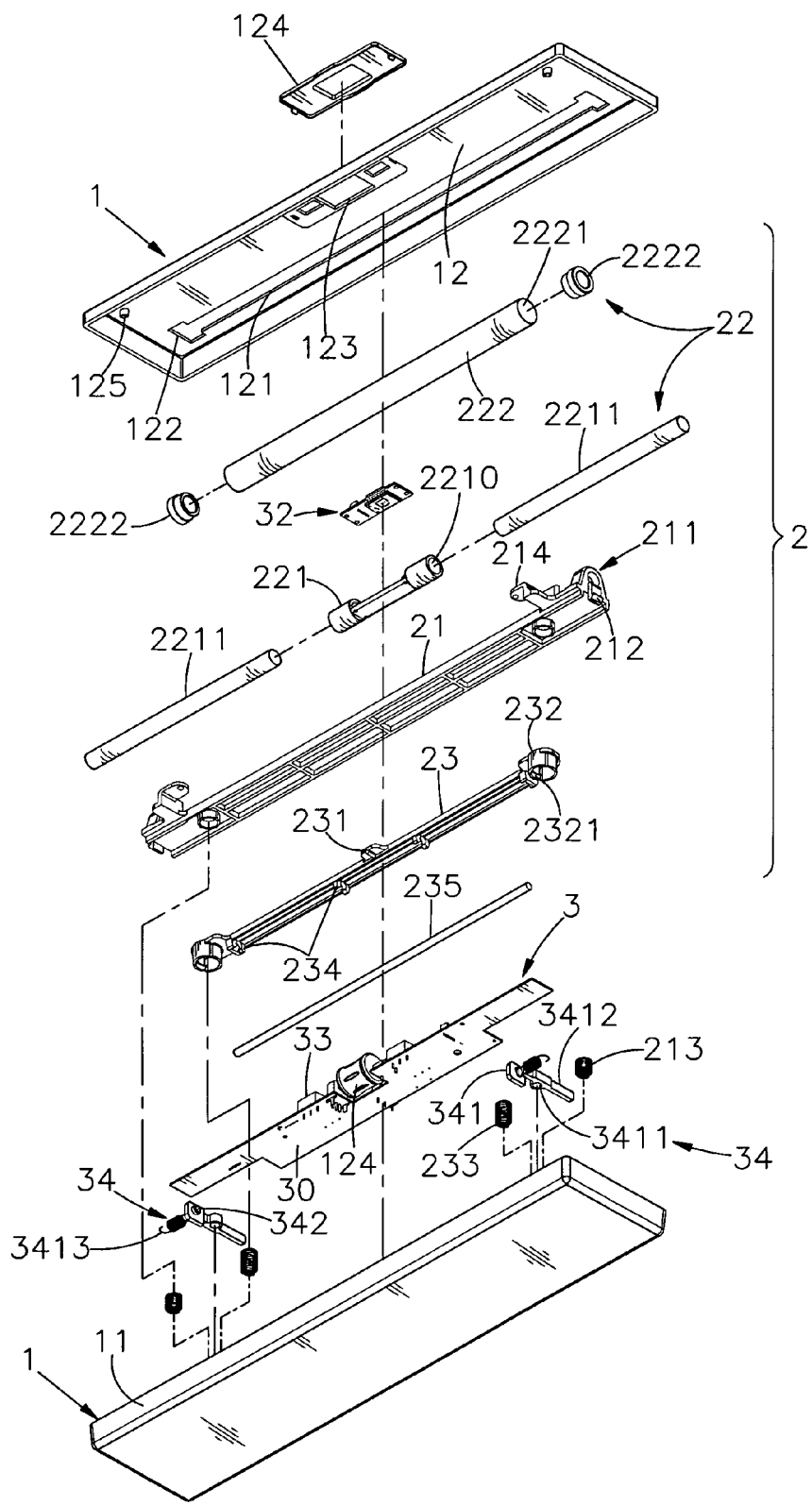
FIG. 3 is another exploded view of the operation control device in accordance with the present invention when viewed from another angle.
Figure 4:
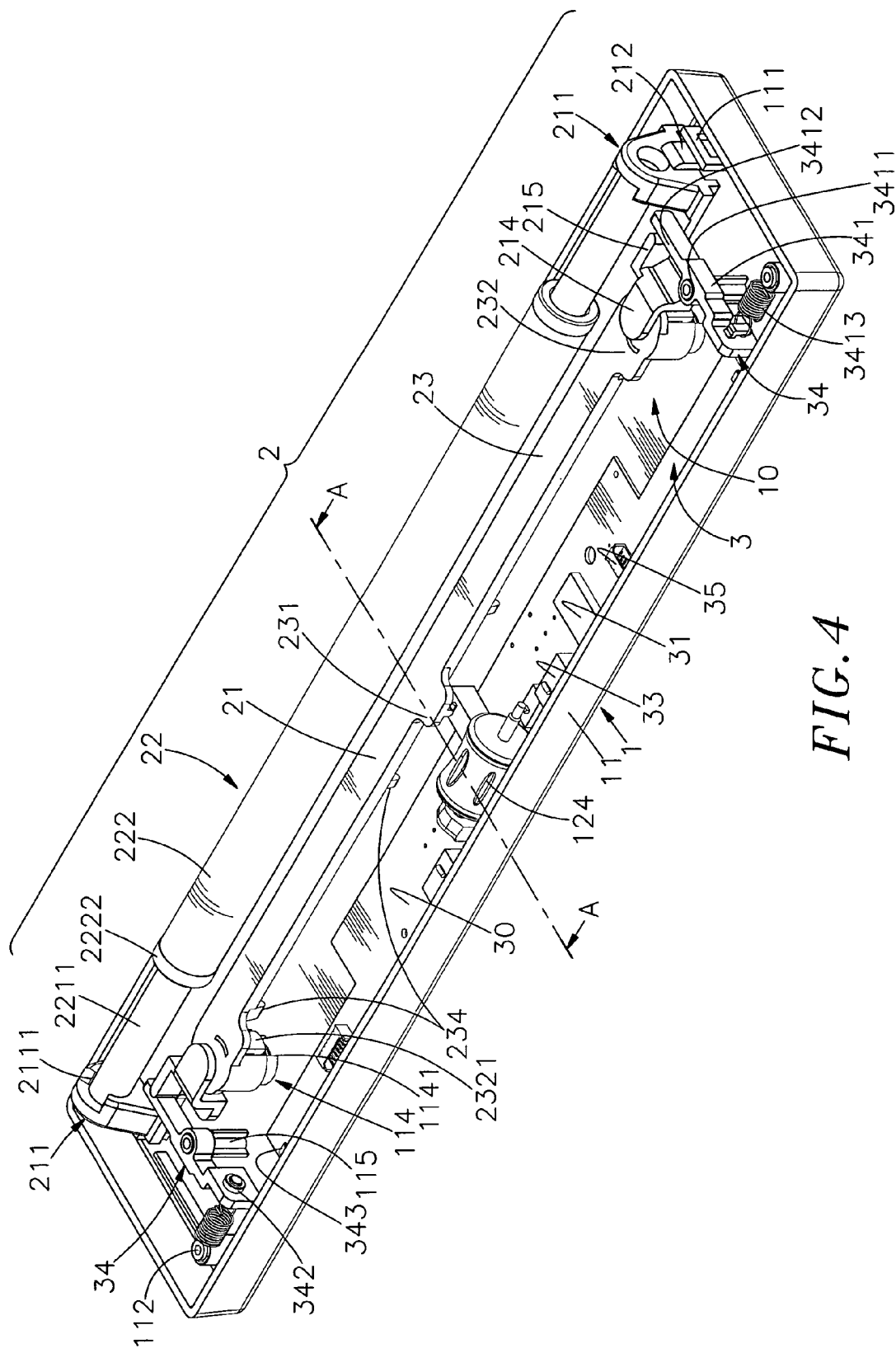
FIG. 4 is an elevational view of the operation control device in accordance with the present invention after removal of the top cover shell of the housing.

Referring to FIGS. 1, 2, 3 and 4, an operation control device in accordance with the present invention is shown comprising a housing 1, a control module 2 and a circuit module 3.

The housing 1 comprises a bottom cover shell 11, a top cover shell 12 covered on the bottom cover shell 11 and an accommodation chamber 10 defined in between the bottom cover shell 11 and the top cover shell 12. The bottom cover shell 11 comprises a plurality of upright retaining lugs 111 and posts 112 respectively symmetrically disposed near the two distal ends thereof, a plurality of spring seats 113 bilaterally disposed near the rear side and respectively disposed adjacent to the upright retaining lugs 111, a plurality of spring holders 114 respectively disposed at a front side relative to the spring seats 113, and a plurality of upright pivot pins 115 respectively disposed adjacent to the posts 112. The top cover shell 12 comprises two locating holes 122 disposed near the two distal ends thereof, an elongated slot 121 connected between the two locating holes 122 in communication with the accommodation chamber 10, a front opening 123 located on the middle near the front side thereof for the mounting of an operating device 124, and a plurality of connection elements 125 respectively fastened to the posts 112 of the bottom over shell 11.

The control module 2 is accommodated in the accommodation chamber 10 of the housing 1, comprising a carrier frame 21, a movable operating device 22 carried on the carrier frame 21 and peripherally partially protruding over the elongated slot 121 of the top cover shell 12 of the housing 1, and a plurality of spring members 213 respectively mounted in the spring seats 113 and stopped against the bottom wall of the carrier frame 21 to support the carrier frame 21 in a floating condition. The carrier frame 21 comprises two end lugs 211 respectively upwardly extended from the two distal ends thereof and respectively fastened to the locating holes 122 of the top cover shell 12 and protruding over the top side of the top cover shell 12 of the housing 1 for supporting the movable operating device 22, two coupling hooks 212 respectively downwardly extended from the end lugs 211 and respectively coupled to the upright retaining lugs 111 of the bottom cover shell 11 of the housing 1, a plurality of press portions 214 located on the front side thereof, and a plurality of bearing portions 215 respectively abutted against the press portion 214. The movable operating device 22 comprises an elongated base member 221 that comprises a coupling hole 2210 axially disposed at each of two distal ends thereof and two rod members 2211 respectively mounted between the coupling hole 2210 on each of the distal ends of the elongated base member 221 and a retaining groove 2111 on each of the two end lugs 211 of the carrier frame 21, a sleeve 222 sleeved onto the rod members 2211 and the elongated base member 221, and two annular end caps 2222 respectively fastened to the two distal ends of the axial hole 2221 of the sleeve 222 and supported on the rod members 2211 for allowing the sleeve 222 to be rotated and axially slidably moved with the annular end caps 2222 relative to the elongated base member 221 and the rod members 2211.

The control module 2 further comprises an actuation member 23, which comprises an actuation portion 231 located on the middle part of the front side thereof, two annular end blocks 232 respectively downwardly protruded from the two distal ends thereof and respectively capped on the spring holders 114, a hook 2321 extended from each of the annular end blocks 232 and respectively hooked in a vertically extending hook hole 1141 on each of the spring holders 114 and a plurality of pivot holders 234 located on the bottom side thereof, two spring members 233 respectively mounted in between the spring holders 114 and the annular end blocks 232 to support the actuation member 23 in the bottom cover shell 11 in a floating condition, and a balance rod 235 pivotally mounted in the pivot holders 234 of the actuation member 23.

The circuit module 3 is accommodated in the accommodation chamber 10 inside the housing 1 at a front side relative to the control module 2, comprising a circuit board 30, a microprocessor 31 installed in the circuit board 30, a rotation sensor module 32 mounted in the elongated base member 221 of the movable operating device 22 and electrically connected to the microprocessor 31 and adapted for sensing the amount and direction of rotation of the sleeve 222, a plurality of control switches 33 electrically connected to the microprocessor 31 and operable by the operating device 124 and the actuation portion 231 of the actuation member 23, two magnetic sensors 34 electrically connected to the microprocessor 31 and respectively disposed near the two distal ends of the movable operating device 22 and adapted for sensing the direction and amount of axial displacement of the movable operating device 22 in a non-contact manner and producing a corresponding signal, and a connection interface 35 electrically connected to the microprocessor 31 and electrically connectable to a communication port of an external electronic apparatus, for example, computer (not shown) for signal transmission in a wired or wireless manner. The connection interface 35 can be a wired interface means, such as USB or PS2 connector, or a wireless interface means, such as infrared, radio-frequency, or Bluetooth interface means.

The aforesaid magnetic sensors 34 each comprise a lever 341, which has a pivot hole 3411 vertically located on a middle part thereof and pivotally coupled to one of the upright pivot pins 115 of the bottom cover shell 11 and a contact portion 3412 located on one end, namely, the rear end thereof and rested in one respective bearing portion 215 of the carrier frame 21 and pushable by the sleeve 222 by means of one respective annular end cap 2222, a magnet 342 located on one side of an opposite end, namely, the front end of the lever 341, a magnetic sensing element 343 located on one of the two distal ends of the circuit board 30 and electrically connected to the microprocessor 31 for sensing approach of the magnet 342, and a return spring 3413 connected between the opposite side of the front end of the lever 341 and one of the two posts 112 of the bottom cover shell 11 for returning the lever 341 to its former position after the lever 341 having been biased.

In the aforesaid preferred embodiment of the present invention, the housing 1 consists of the bottom cover shell 11 and the top cover shell 12. Alternatively, the housing 1 can be a single-piece member having an accommodation chamber 10 defined therein for accommodating the control module 2 and the circuit module 3. Further, the rod members 2211 of the movable operating device 22 can be round rods, oval rods, or any other shape of rods that facilitates rotating and sliding the sleeve 222 relative to the rotation sensor module 32 in the elongated base member 221. Further, the rod members 2211 are made of a self-lubricating material, for example, POM (polyoxymethylene) or PTFE (polytetrafluoroethylene). The rotation sensor module 32 comprises a light transmitter (not shown) adapted for emitting a predetermined light onto the inside wall of the sleeve 222, a lens (not shown), and a light receiver adapted for receiving the light reflected by the inside wall of the sleeve 222 through the lens and outputting a corresponding signal to the microprocessor 31 for computing. Thus, when the user rotates the sleeve 222, the rotation sensor module 32 will output a signal to the microprocessor 31 that is indicative of the amount and direction of the rotation of the sleeve 222. Further, the inside wall of the sleeve 222 can be colored, or processed to provide recessed portions or raised portions, facilitating mapping and image recognition.

After computing of the sensed signal from the rotation sensor module 32 by the microprocessor 31, the microprocessor 31 outputs a control signal through the connection interface 35 to the external electronic apparatus to control the movement of the cursor on the display screen of the external electronic apparatus. Further, the sleeve 222 can be made of a meshed fabric, nonwoven cloth, plastic, rubber or leather, and peripherally marked with a laser mark, or printed or coated with a textual or graphic design.

Figure 5:
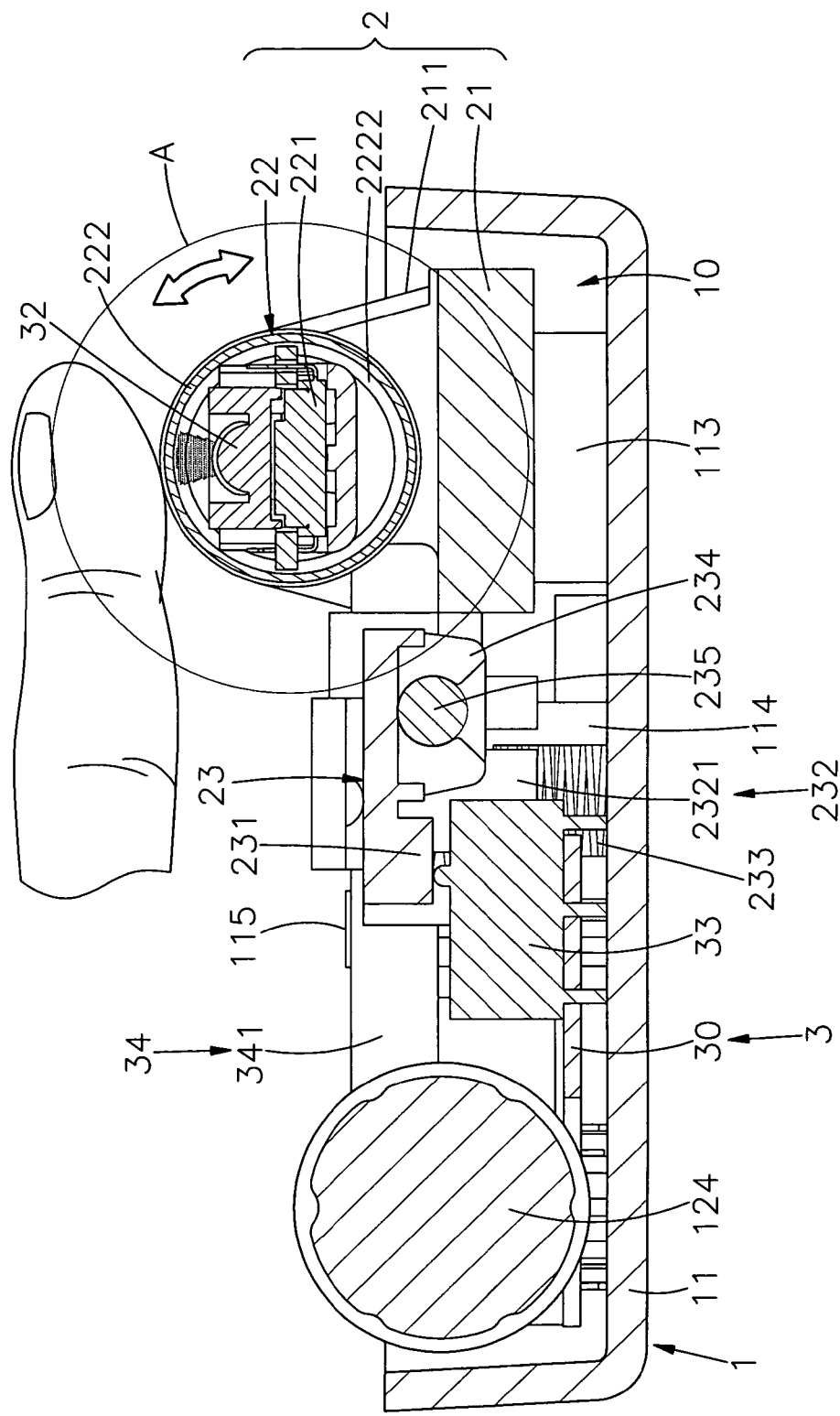
FIG. 5 is a schematic sectional side view taken in an enlarged scale along line 5-5 of FIG. 4.
Figure 6:
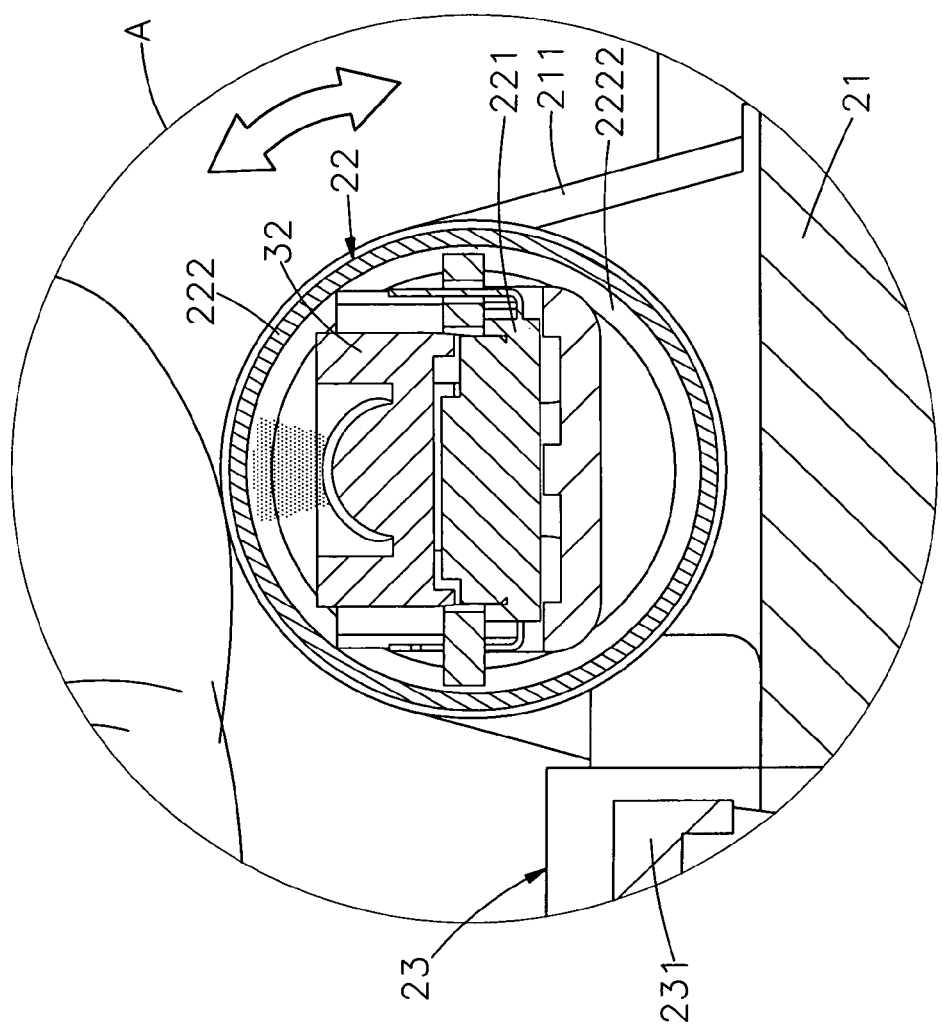
FIG. 6 is an enlarged view of part A of FIG. 5.

Referring to FIGS. 5 and 6 and FIG. 4 again, the operation control device can be used in or with a computer, notebook computer, mobile telephone or any of a variety of other electronic apparatus. During application, the connection interface 35 is electrically connected to a communication port of the external electronic apparatus by a wired (or wireless) connection method. At this time, the user can rest the wrists of the hands on a wrist pad (not shown) in front of the front opening 123 of the top cover shell 12 of the housing 1, and rotate the sleeve 222 on the elongated base member 221 with the fingers. At this time, the rotation sensor module 32 senses the direction and amount of the rotation of the sleeve 222, and outputs a corresponding signal to the microprocessor 31, enabling the microprocessor 31 to output a corresponding control signal through the connection interface 35 to the external electronic apparatus to control the movement of the cursor on the display screen of the external electronic apparatus in Y-axis direction (up/down direction). Further, the annular end caps 2222 support the sleeve 222 on the rod members 2211, enabling the sleeve 222 to be rotated transversely forwards/backwards and moved axially leftwards/rightwards on the rod members 2211 relative to the elongated base member 221 and the rotation sensor module 32 without causing much friction. Thus, the user can operate the movable operating device 22 stably and comfortably.

Further, as stated above, the rotation sensor module 32 is mounted in the elongated base member 221 between the rod members 2211 and surrounded by the sleeve 222. Therefore, the sleeve 222 protects the rotation sensor module 32 against outside dust and micro particles and keeps the rotation sensor module 32 from sight, assuring sensing accuracy of the rotation sensor module 32 and saving the surface space of the circuit board 30. Thus, the invention has small-sized and nice-looking characteristics.

Figure 7:
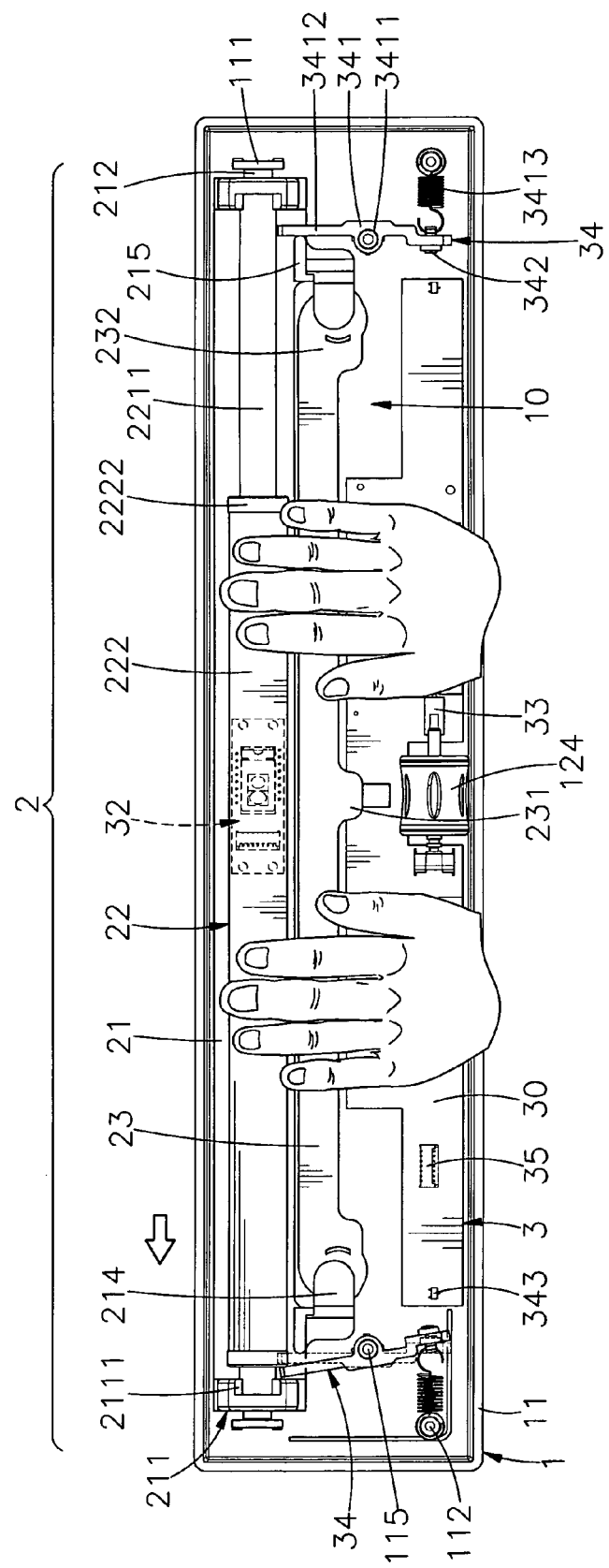
FIG. 7 is a schematic top view of the present invention, illustrating an operation status of the operation control device.
Figure 8:
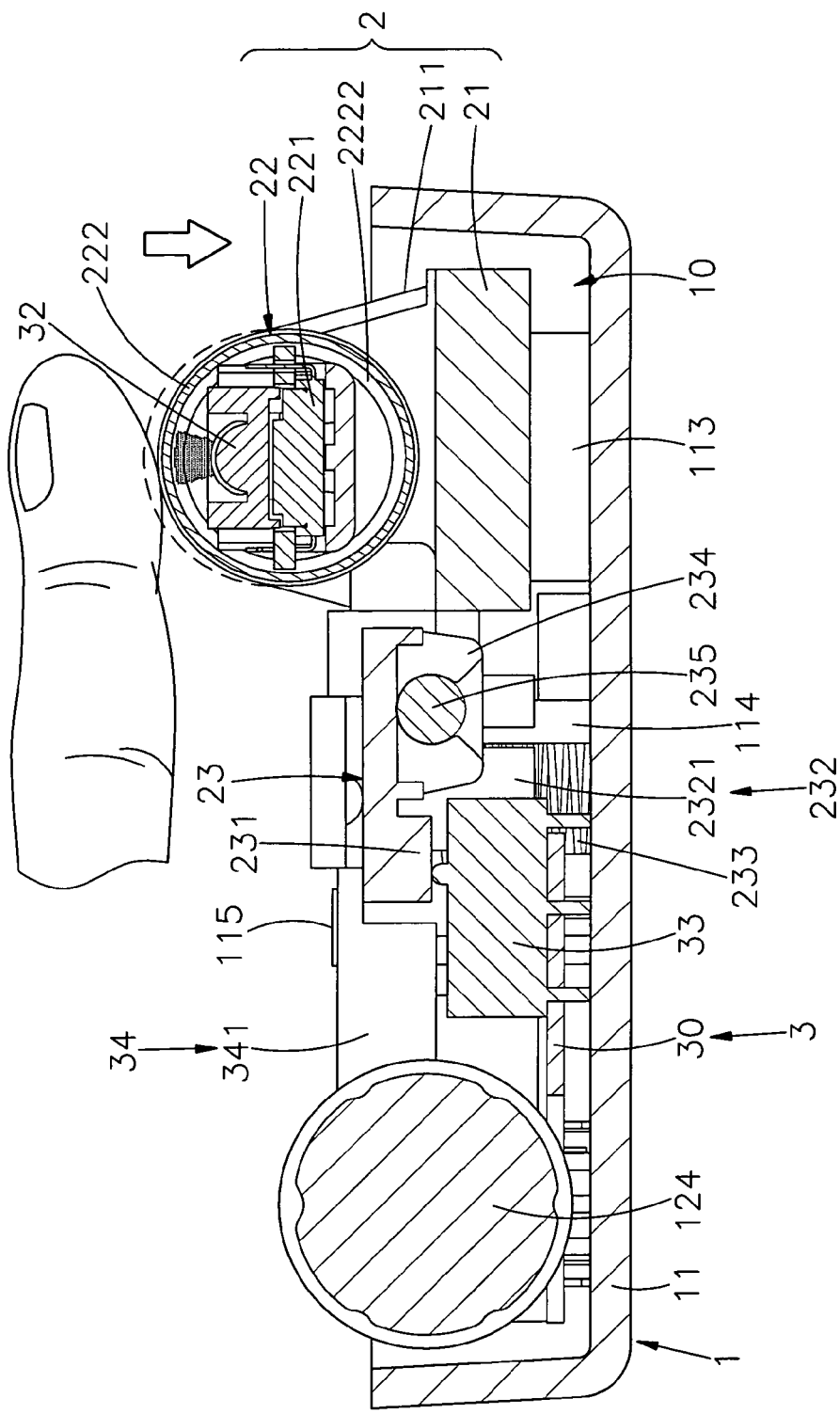
FIG. 8 is a schematic sectional view of the present invention, illustrating the user pressed the sleeve of the movable operating device.

Referring to FIGS. 7 and 8 and FIGS. 2 and 4 again, the length of the sleeve 222 is shorter than the length of the elongated slot 121 of the top cover shell 12 of the housing 1, and the rotation sensor module 32 is surrounded by the sleeve 222. Thus, the user can slide the sleeve 222 axially leftwards or rightwards in the elongated slot 121 along the rod members 2211. When moving the sleeve 222 axially in the elongated slot 121 toward one locating hole 122, one annular end cap 2222 is forced against the contact portion 3412 of the lever 341 of one magnetic sensor 34 to bias the lever 341 in one direction, moving the magnet 342 of the respective magnetic sensor 34 toward the associating magnetic sensing element 343 at the circuit board 30. At this time, the magnetic sensing element 343 senses the strength of the magnetic field induced by the magnet 342 that is indicative of the distance of axial displacement of the sleeve 222, and outputs a corresponding signal to the microprocessor 31, enabling the microprocessor 31 to output a corresponding control signal through the connection interface 35 to the external electronic apparatus to control the movement of the cursor on the display screen of the external electronic apparatus in X-axis direction (left/right direction). Further, the magnetic sensing element 343 can be a Hall IC or MR (magneto-resistive) sensor. Subject to the non-contact sensing operation of the magnetic sensors 34, the invention effectively and accurately senses the amount and direction of the displacement of the sleeve 222 and eliminates the drawbacks of mechanical fatigue and contact error of conventional contact switch designs.

Further, when the user presses down the sleeve 222 of the movable operating device 22 to lower the carrier frame 21, the coupling hooks 212 are lowered with the carrier frame 21 relative to the upright retaining lugs 111 of the bottom cover shells 11 of the housing 1, and the press portions 214 are lowered with the carrier frame 21 to force the actuation member 23 downwardly, causing the respective hooks 2321 to be moved downwardly in the respective vertically extending hook holes 1141 of the respective spring holders 114. At this time, the spring members 213 are compressed between the respective spring seats 113 and the carrier frame 21, and the spring members 233 are compressed between the respective spring holders 114 and the annular end blocks 232 of the actuation member 23. At the same time, the actuation portion 231 of the actuation member 23 is forced to trigger one control switch 33 on the circuit board 30 of the circuit module 3, producing a cursor clicking effect. Thus, the user can press down, rotate or slide the sleeve 22 to drag or click the cursor. When released the pressure from the sleeve 22, the spring members 213; 233 immediately return the carrier frame 21 and the actuation member 23 upwardly to their former position.

Further, when the user presses down the sleeve 22, the pressure may be applied to the sleeve 22 at a location deviated from the midpoint of the sleeve 22, causing the sleeve 22, the carrier frame 21 and the actuation member 23 to tilt. This problem is eliminated subject to the functioning of the balance rod 235. As stated above, the balance rod 235 is pivotally coupled to the pivot holders 234 of the actuation member 23. When the carrier frame 21 is moved downwards, the balance rod 235 is biased to keep the carrier frame 21 and the actuation member 23 in balance. Further, the aforesaid operating device 124 can be a button, roller, rolling ball, or any finger-operable member operable by the user to trigger one control switch 33 of the circuit module 3 in controlling the cursor to perform a specific input mode.

A prototype of operation control device has been constructed with the features of FIGS. 1~8. The operation control device functions smoothly to provide all of the features disclosed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. An operation control device used with an electronic apparatus and operable to control the functioning of a cursor on a display screen of said electronic apparatus, the operation control device comprising:

a housing defining an accommodation chamber therein and an elongated slot on a top side thereof in communication with said accommodation chamber;

a control module, said control module, comprising a carrier frame mounted in said accommodation chamber, said carrier frame comprising an end lug at each of two distal ends thereof, and a movable operating device, said movable operating device comprising an elongated base member connected between the two end lugs of said carrier frame and a sleeve sleeved on said elongated base member and suspending in said elongated slot of said housing and partially peripherally protruding over the top side of said housing for rotation on said elongated base member by a person; and a circuit module mounted in said accommodation chamber inside said housing, said circuit module comprising a microprocessor, a rotation sensor module mounted in said elongated base member and surrounded by said sleeve and electrically connected to said microprocessor and adapted for sensing the direction and amount of rotation of said sleeve relative to said elongated base member and producing a respective signal to said microprocessor.

2. The operation control device as claimed in claim 1, wherein said housing comprises a bottom cover shell, said bottom cover shell comprising a plurality of posts suspending in two opposing corners in said accommodation chamber, and a top cover shell covering said bottom cover shell, said top cover shell comprising a plurality of connection elements respectively fastened to said posts of said bottom over shell.

3. The operation control device as claimed in claim 1, wherein said housing comprises a plurality of upright retaining lugs disposed in two opposite lateral sides in said accommodation chamber; said movable operating device further comprises a plurality of coupling hooks respectively extended from two distal ends of said carrier frame and respectively hooked in said upright retaining lugs to vertically movably secure said carrier frame to said upright retaining lugs and a plurality of first spring members supported between a bottom wall of said housing and said carrier frame; said circuit module further comprises a plurality of control switches respectively electrically connected to said microprocessor, one said control switch being pressable by said carrier frame to produce a control signal when a person imparts a downward pressure to said sleeve.

4. The operation control device as claimed in claim 3, wherein said carrier frame comprises a plurality of press portions bilaterally disposed at a front side thereof; said control module further comprises an actuation member disposed at a front side relative to said carrier frame and kept in contact with said press portions of said carrier frame and lowerable by said press portions, said actuation member comprising an actuation portion protruded from a middle part of a front side thereof and adapted for triggering one said control switch when said sleeve is pressed downwards by a person, and a plurality of second spring members bilaterally connected between a bottom wall of said housing and said actuation member.

5. The operation control device as claimed in claim 3, wherein said housing further comprises a plurality of spring holders bilaterally disposed in said accommodation chamber and adapted for accommodating said second spring members, each said spring holder defining a vertically extending hook hole; said actuation member comprises a plurality of hooks respectively extended from two distal ends thereof respectively and vertically slidably coupled to the vertically extending hook holes of said spring holders, a plurality of pivot holders located on a bottom side thereof, and a balance rod pivotally mounted in said pivot holders.

6. The operation control device as claimed in claim 1, wherein said housing comprises two upright pivot pins bilaterally disposed in said accommodation chamber; said circuit module further comprises two magnetic sensors adapted for sensing the direction and amount of axial movement of said sleeve, each said magnetic sensor comprising a lever pivotally mounted on one said upright pivot pin and biasable by said movable operating device upon an axial displacement of said sleeve relative to said elongated base member, a magnet mounted on one end of said lever, and a magnetic sensing element mounted on said circuit board and electrically connected to said microprocessor and adapted for sensing the strength of a magnetic field induced by said magnet indicative of the direction and amount of axial displacement of said sleeve.

7. The operation control device as claimed in claim 6, wherein the lever of each said magnetic sensor comprises a vertical pivot hole located on a middle part thereof and pivotally coupled to one said upright pivot pin and a contact portion located on one end thereof and pushable by said sleeve to bias said lever in moving the magnet of the respective magnetic sensor at an opposite end of said lever toward the magnetic sensing element of the respective magnetic sensor; each said magnetic sensor further comprises a return spring connected between the opposite end of the associating lever and a part of said housing.

8. The operation control device as claimed in claim 6, wherein the magnetic sensing element of each said magnetic sensor is a Hall IC.

9. The operation control device as claimed in claim 6, wherein the magnetic sensing element of each said magnetic sensor is a MR (magneto-resistive) sensor.

10. The operation control device as claimed in claim 1, wherein said elongated base member of said movable operating device comprises a coupling hole axially disposed at each of two distal ends thereof; said movable operating device further comprises two rod members respectively mounted between the coupling hole on each of the distal ends of said elongated base member and a retaining groove on each of the two end lugs of said carrier frame, and two annular end caps respectively fastened to two distal ends of said sleeve and supported on said rod members for allowing said sleeve to be rotated and axially slidably moved with said annular end caps relative to said elongated base member and said rod members.

11. The operation control device as claimed in claim 1, wherein said circuit module further comprises a connection interface electrically connected to said microprocessor and electrically connectable to a communication port of an external computer for communication.

12. The operation control device as claimed in claim 11, wherein said connection interface is a wired connection interface selected from the group of USB and PS2.

13. The operation control device as claimed in claim 11, wherein said connection interface is a wireless connection interface selected from the group of infrared, radio-frequency and Bluetooth interfaces.

* * * * *